United States Patent
Park et al.

(10) Patent No.: US 10,658,687 B2
(45) Date of Patent: May 19, 2020

(54) AIR SHUT-OFF VALVE APPARATUS FOR FUEL CELL SYSTEM AND METHOD OF CONTROLLING SAME

(71) Applicants: Hyundai Motor Company, Seoul (KR); Kia Motors Corporation, Seoul (KR)

(72) Inventors: Jeong Hee Park, Gyeonggi-do (KR); Byeong Seung Lee, Gangnam-gu (KR); Duck Whan Kim, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 196 days.

(21) Appl. No.: 15/627,929

(22) Filed: Jun. 20, 2017

(65) Prior Publication Data

US 2018/0166712 A1 Jun. 14, 2018

(30) Foreign Application Priority Data

Dec. 14, 2016 (KR) .................. 10-2016-0170852

(51) Int. Cl.
  *H01M 8/04* (2016.01)
  *H01M 8/04089* (2016.01)
  (Continued)

(52) U.S. Cl.
  CPC ....... *H01M 8/04089* (2013.01); *F16K 1/2021* (2013.01); *F16K 11/052* (2013.01);
  (Continued)

(58) Field of Classification Search
  CPC ......... H01M 8/04089; H01M 8/04231; H01M 8/04225; H01M 8/04761; H01M 8/04753;
  (Continued)

(56) References Cited

U.S. PATENT DOCUMENTS 3,861,646 A   1/1975   Douglas
6,135,415 A   10/2000  Kloda et al.
(Continued)

FOREIGN PATENT DOCUMENTS

DE   3501827 A1    9/1985
DE   10215913 C1   10/2003
(Continued)

OTHER PUBLICATIONS

Extended European Search Report for European Patent Application No. 17180460.2, dated Sep. 21, 2017, 9 pages.
(Continued)

*Primary Examiner* — Cynthia K Walls
(74) *Attorney, Agent, or Firm* — Mintz Levin Cohn Ferris Glovsky and Popeo, P.C.; Peter F. Corless (57) ABSTRACT

An air shut-off valve apparatus for a fuel cell system and a method of controlling the same are provided. In particular, hydrogen injected into a fuel cell stack is discharged by being diluted with external air when starting the fuel cell system. The apparatus includes a valve body that has an inlet air path connected to a cathode of the fuel cell stack and through which air injected into the fuel cell stack flows, and an outlet air path through which air discharged from the fuel cell stack flows. A bypass body is provided and includes a bypass air path that connects the inlet air path and the outlet air path and a valve flap is disposed at the valve body and opens and closes the inlet and outlet air paths at a first side thereof, and the bypass air path at a second side thereof.

7 Claims, 7 Drawing Sheets

(51) Int. Cl.
  *H01M 8/04225* (2016.01)
  *H01M 8/04302* (2016.01)
  *H01M 8/04223* (2016.01)
  *H01M 8/0438* (2016.01)
  *H01M 8/04746* (2016.01)
  *F16K 17/164* (2006.01)
  *F16K 1/20* (2006.01)
  *F16K 11/052* (2006.01)

(52) U.S. Cl.
  CPC ......... *F16K 17/164* (2013.01); *H01M 8/0441* (2013.01); *H01M 8/04225* (2016.02); *H01M 8/04231* (2013.01); *H01M 8/04302* (2016.02); *H01M 8/04395* (2013.01); *H01M 8/04753* (2013.01); *H01M 8/04761* (2013.01)

(58) Field of Classification Search
  CPC ........... H01M 8/0441; H01M 8/04302; H01M 8/04395; F16K 1/2021; F16K 11/052; F16K 17/164
  See application file for complete search history.

(56) References Cited

U.S. PATENT DOCUMENTS

| | | | |
|---|---|---|---|
| 6,397,874 B1* | 6/2002 | Featheringill | E03F 1/006 137/112 |
| 6,622,986 B2 | 9/2003 | Gagnon | |
| 6,976,359 B2 | 12/2005 | Hastings et al. | |
| 7,726,626 B2 | 6/2010 | Akabane | |
| 8,499,557 B2 | 8/2013 | Grabowska | |
| 2002/0033194 A1 | 3/2002 | Gagnon | |
| 2004/0224200 A1 | 11/2004 | Ichikawa et al. | |
| 2009/0208795 A1 | 8/2009 | Skala et al. | |
| 2010/0003554 A1 | 1/2010 | Haushaelter et al. | |
| 2011/0117470 A1* | 5/2011 | Aras | H01M 8/04014 429/452 |
| 2012/0264028 A1 | 10/2012 | Skala | |
| 2013/0202979 A1 | 8/2013 | Katano et al. | |
| 2014/0203202 A1 | 7/2014 | Xu | |
| 2015/0068626 A1 | 3/2015 | Bareis et al. | |
| 2016/0141661 A1 | 5/2016 | Kim et al. | |
| 2017/0022943 A1* | 1/2017 | Gerards | F02D 9/06 |

FOREIGN PATENT DOCUMENTS

| | | | |
|---|---|---|---|
| DE | 102008035990 A1 | 2/2010 | |
| DE | 102013021507 A1 | 6/2015 | |
| DE | 102014104578 | * 10/2015 | ............ F02M 26/70 |
| JP | S50-128722 U | 10/1975 | |
| JP | S56-97664 A | 8/1981 | |
| JP | S57-61865 A | 4/1982 | |
| JP | H02-094979 U | 7/1990 | |
| JP | 2007-285311 A | 11/2007 | |
| JP | 2007-317475 A | 12/2007 | |
| JP | 2009-187701 A | 8/2009 | |
| JP | 2009-259577 A | 11/2009 | |
| JP | 2011-222356 A | 11/2011 | |
| JP | 2012-172519 A | 9/2012 | |
| JP | 5023743 B2 | 9/2012 | |
| JP | 2016-122541 A | 7/2016 | |
| KR | 2011-0079938 A | 7/2011 | |
| KR | 2012-0019764 A | 3/2012 | |
| KR | 2014-0073986 A | 6/2014 | |
| KR | 10-1534746 B1 | 7/2015 | |

OTHER PUBLICATIONS

Extended European Search Report for European Patent Application No. 16163116, dated Sep. 14, 2016, 8 pages.
"Office Action issued in European Application No. 17180460.2", dated Feb. 21, 2019, 8 pages.

* cited by examiner

AIR SHUT-OFF VALVE APPARATUS FOR FUEL CELL SYSTEM AND METHOD OF CONTROLLING SAME

CROSS REFERENCE TO RELATED APPLICATION

The present application claims priority to Korean Patent Application No. 10-2016-0170852, filed Dec. 14, 2016, the entire contents of which is incorporated herein for all purposes by this reference.

BACKGROUND

Field of the Invention

The present invention relates generally to an air shut-off valve apparatus for a fuel cell system and a method of controlling the same, and more particularly, to an air shut-off valve apparatus for a fuel cell system and a method of controlling the same, wherein hydrogen injected into a fuel cell stack is discharged by being diluted with external air when starting the fuel cell system.

Description of the Related Art

In general, a fuel cell system is an apparatus in which electricity and water are generated through a chemical reaction of hydrogen as fuel gas with oxygen in the air. A hydrogen fuel cell vehicle is a vehicle that uses electricity generated from the fuel cell system as a driving source. The fuel cell system includes a fuel cell stack that generates electrical energy and the fuel cell stack includes a cathode (also referred to as an air electrode or an oxygen electrode or a reduction electrode), an anode (also referred to as a fuel electrode or a hydrogen electrode or an oxidation electrode), and an electrolyte membrane between the cathode and the anode.

When the fuel cell system is in operation, external air becomes humidified air while passing through a filter, a blower and a membrane humidifier, whereafter the humidified air is supplied to the cathode of the fuel cell stack. Then, hydrogen supplied to the anode of the fuel cell stack is decomposed into hydrogen ions ($H^+$) and electrons ($e^-$) by a catalyst. Only hydrogen ions ($H^+$) pass through the electrolyte membrane and are transferred to the cathode while electrons ($e^-$) are transferred to the cathode through a diffusion layer and a separator.

At the cathode, hydrogen ions ($H^+$) transferred through the electrolyte membrane and electrons ($e^-$) transferred through the separator react with oxygen in the air, thereby forming water. Particularly, due to movement of hydrogen ions ($H^+$), electrons ($e^-$) flow from the anode to the cathode through an external circuit, thereby producing electricity. Thus, when the fuel cell system is in operation, humidified air passing through the membrane humidifier must be supplied to the cathode of the fuel cell stack. When operation of the fuel cell system is terminated, humidified air must be blocked from being supplied to the cathode. Accordingly, an air shut-off valve apparatus for adjusting air flow is mounted on the cathode the fuel cell stack.

The air shut-off valve apparatus is installed at inlet and outlet air paths that are connected to the cathode. When operation of the fuel cell system is terminated, humidified air must be completely blocked from being supplied to the cathode to ensure durability of the fuel cell stack. On the other hand, when the hydrogen fuel cell vehicle is started, hydrogen is injected into the anode, and then an air compressor is driven to inject air into the cathode. In particular, purged hydrogen inside the fuel cell stack may not be sufficiently diluted with air and then flows to the outlet air path by injection pressure. Accordingly, the concentration of hydrogen in exhaust gas discharged through the outlet air path is temporarily increased, thereby resulting in failure to satisfy regulations.

The foregoing is intended merely to aid in the understanding of the background of the present invention, and is not intended to mean that the present invention falls within the purview of the related art that is already known to those skilled in the art.

SUMMARY

Accordingly, the present invention provides an air shut-off valve apparatus for a fuel cell system and a method of controlling the same, wherein hydrogen injected into a fuel cell stack may be discharged by being diluted with external air when starting the fuel cell system.

According to one aspect of the present invention, an air shut-off valve apparatus for a fuel cell system may include: a valve body having an inlet air path connected to a cathode of a fuel cell stack and through which air injected into the fuel cell stack flows, and an outlet air path through which air discharged from the fuel cell stack flows; a bypass body having a bypass air path that connects the inlet air path and the outlet air path; and a valve flap disposed at the valve body in a hinged manner and configured to open and close the inlet air path and the outlet air path at a first side thereof, and to open and close the bypass air path at a second side thereof.

The bypass body may communicate with both the inlet air path and the outlet air path in a direction in which the air injected into the fuel cell stack is introduced, based on the valve flap. The apparatus may further include a valve motor disposed at the valve body; and a valve shaft rotatably disposed at the valve body to be operated in conjunction with operation of the valve motor, with the valve flap fixedly coupled with the valve shaft.

A plurality of valve flaps may be provided and the valve flaps open and close the inlet air path and the outlet air path at the first sides thereof, and open and close the bypass air path at the second sides thereof, wherein each of the valve flaps may include: a valve plate coupled with the valve shaft; and a plate cover made of a rubber material and covering the valve plate. The plate cover corresponding to the second side of each of the valve flaps may be integrally provided with a first sealing protrusion that contacts a partition wall of the bypass body and surrounds the bypass air path.

The first sealing protrusion may include at least one sealing groove at a portion thereof where the first sealing protrusion contacts the partition wall of the bypass body. The plate cover that corresponds to the first side of each of the valve flaps may be integrally provided with a second sealing protrusion that contacts the partition wall of the bypass body and surrounds the inlet air path and the outlet air path.

The valve body may include: a main body that forms an external shape of the valve body, with the valve flap disposed at the main body in a hinged manner; and a sub-body that contacts the valve flap when the valve flap is in a closing operation, and is coupled with the fuel cell stack by surface contact, and the bypass body may be coupled with the main body. The sub-body and the bypass body may have higher precision than the main body to improve air tightness. The sub-body and the bypass body may have higher rigidity than the main body to be prevented from being damaged by the valve flap.

In another exemplary embodiment, the valve body may include: a main body that forms an external shape of the valve body, with the valve flap disposed at the main body in a hinged manner (e.g., capable of tilting or moving at a tilting angle); and a sub-body that contacts the valve flap when the valve flap is in a closing operation, and is coupled with the fuel cell stack by surface contact, and the bypass body may be integrated with the main body into a single body.

Meanwhile, a method of controlling an air shut-off valve apparatus for a fuel cell system may include: preventing air supplied to a fuel cell stack from being injected into a cathode of the fuel cell stack, and preventing hydrogen from being injected into an anode of the fuel cell stack; bypassing and discharging air supplied to the fuel cell stack without injecting the air supplied to the fuel cell stack into the cathode of the fuel cell stack, and injecting hydrogen into the anode of the fuel cell stack; injecting a part of air (e.g., a first portion, some, etc.) supplied to the fuel cell stack into the cathode of the fuel cell stack while bypassing and discharging another part of the air (e.g., a second portion, remaining portion, etc.) supplied to the fuel cell stack, and discharging hydrogen in the fuel cell stack by diluting the hydrogen with the bypassed air; and injecting air into the cathode of the fuel cell stack while preventing air supplied to the fuel cell stack from being bypassed and discharged.

According to the exemplary embodiment of the present invention, by providing the bypass body having the bypass air path that connects the inlet air path and the outlet air path, and the valve flap capable of selectively opening and closing the inlet air path and the outlet air path together with the bypass air path by a tilting operation, and by operating the valve flap, hydrogen injected into the fuel cell stack can be discharged by being diluted with bypassed external air. Thus, it may be possible to reduce concentration of hydrogen in exhaust gas exhausted when starting the fuel cell system.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinbelow, exemplary embodiments of the present invention will be described in detail with reference to the accompanying drawings. Exemplary embodiments of the present invention are presented to make a complete disclosure of the present invention and help those who are ordinarily skilled in the art best understand the invention. Various changes to the following embodiments are possible and the scope of the present invention is not limited to the following embodiments. Throughout the drawings, the same reference numerals will refer to the same or like parts.

Figure 1:
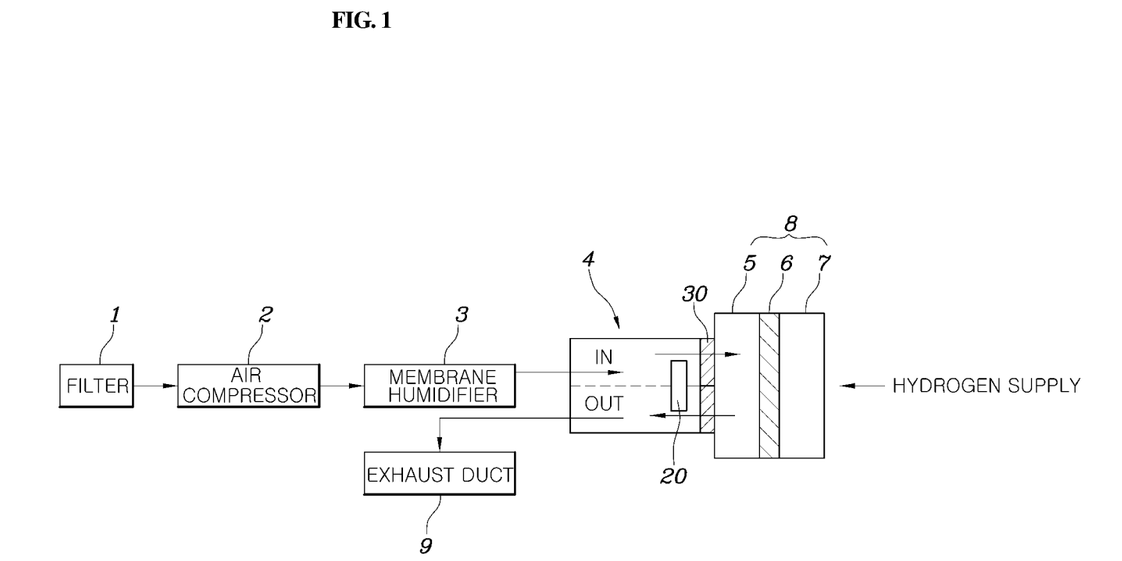
FIG. 1 is a view showing a configuration of the fuel cell system to which the air shut-off valve apparatus according to the exemplary embodiment of the present invention is applied.

First, a fuel cell system to which an air shut-off valve apparatus according to an exemplary embodiment of the present invention is applied will be described in order to explain the present invention. FIG. 1 is a view showing a configuration of the fuel cell system to which the air shut-off valve apparatus according to the exemplary embodiment of the present invention is applied.

As shown in FIG. 1, the fuel cell system may be configured to inject external air into a fuel cell stack 8, with a filter 1, an air compressor 2, a membrane humidifier 3, and an air shut-off valve apparatus 4 connected sequentially, and the air shut-off valve apparatus 4 may be connected to the fuel cell stack 8. In particular, the fuel cell stack 8 may include a cathode 5 to which air is supplied, an anode 7 to which hydrogen is supplied, and an electrolyte membrane 6 disposed between the cathode 5 and the anode 7. Further, the air shut-off valve apparatus 4 may be connected with an exhaust duct 9 through which gas discharged from the fuel cell stack 8 is exhausted. Accordingly, external air becomes humidified air containing moisture while sequentially passing through the filter 1, the air compressor 2, and the membrane humidifier 3. Then, through the air shut-off valve apparatus 4, selectively, the humidified air is supplied to the cathode 5 of the fuel cell stack 8 or bypassed to the exhaust duct 9 and exhausted. Moreover, a part of hydrogen supplied to the anode 7 of the fuel cell stack 8 is exhausted through the exhaust duct 9 by operation of the air shut-off valve apparatus 4.

Figure 2:
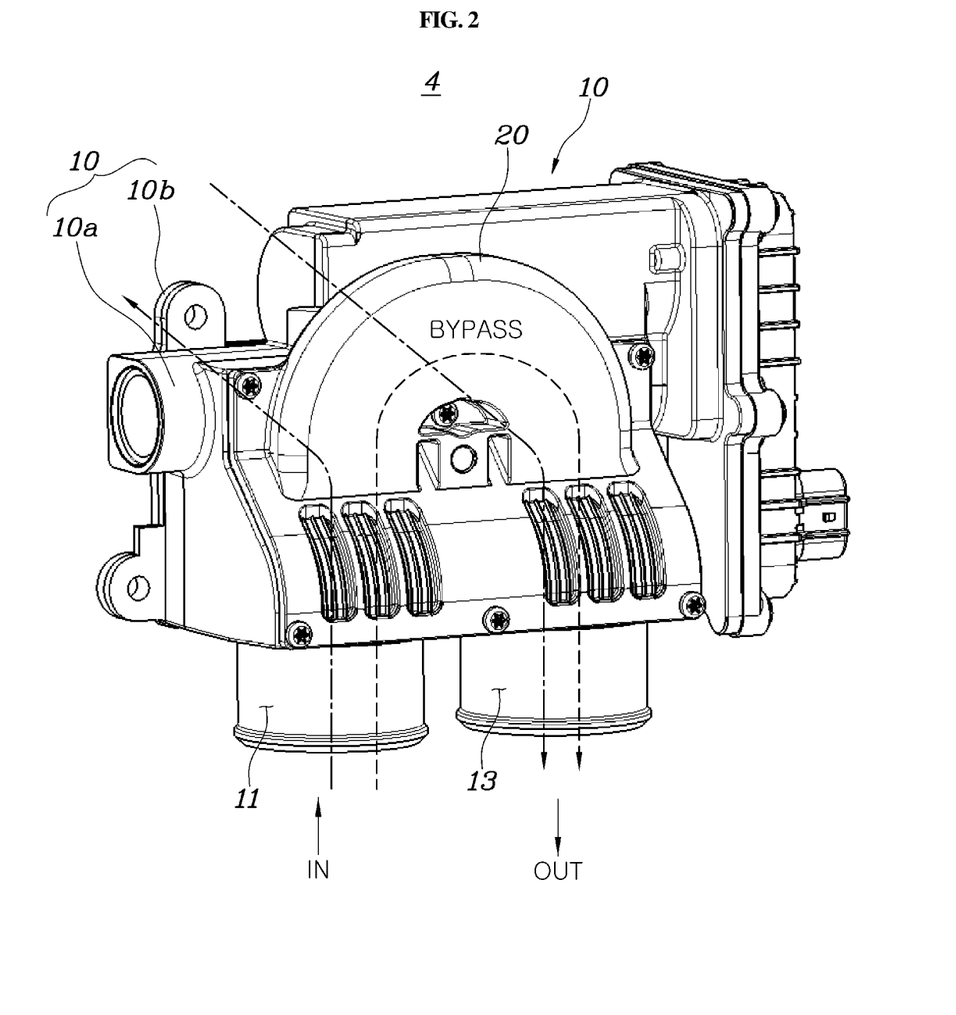
FIG. 2 is a perspective view showing the air shut-off valve apparatus according to the exemplary embodiment of the present invention.
Figure 3:
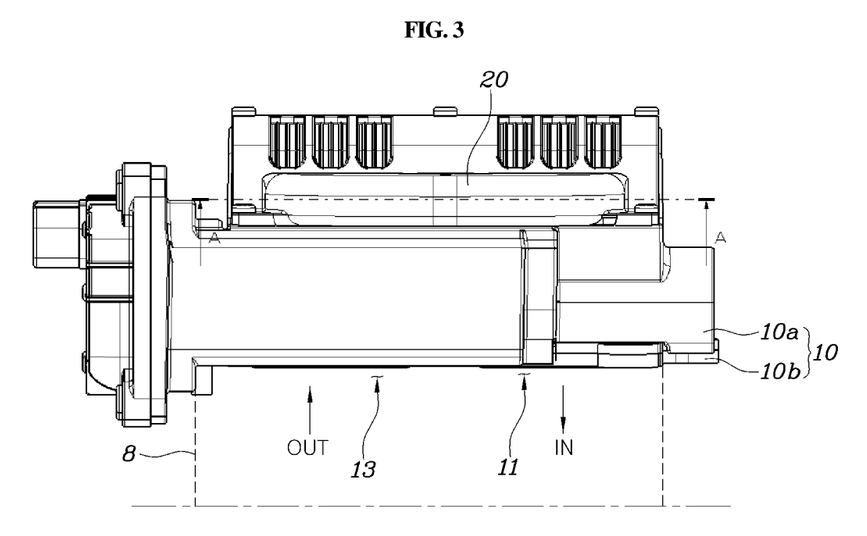
FIG. 3 is a plan view showing the air shut-off valve apparatus according to the exemplary embodiment of the present invention.
Figure 4:
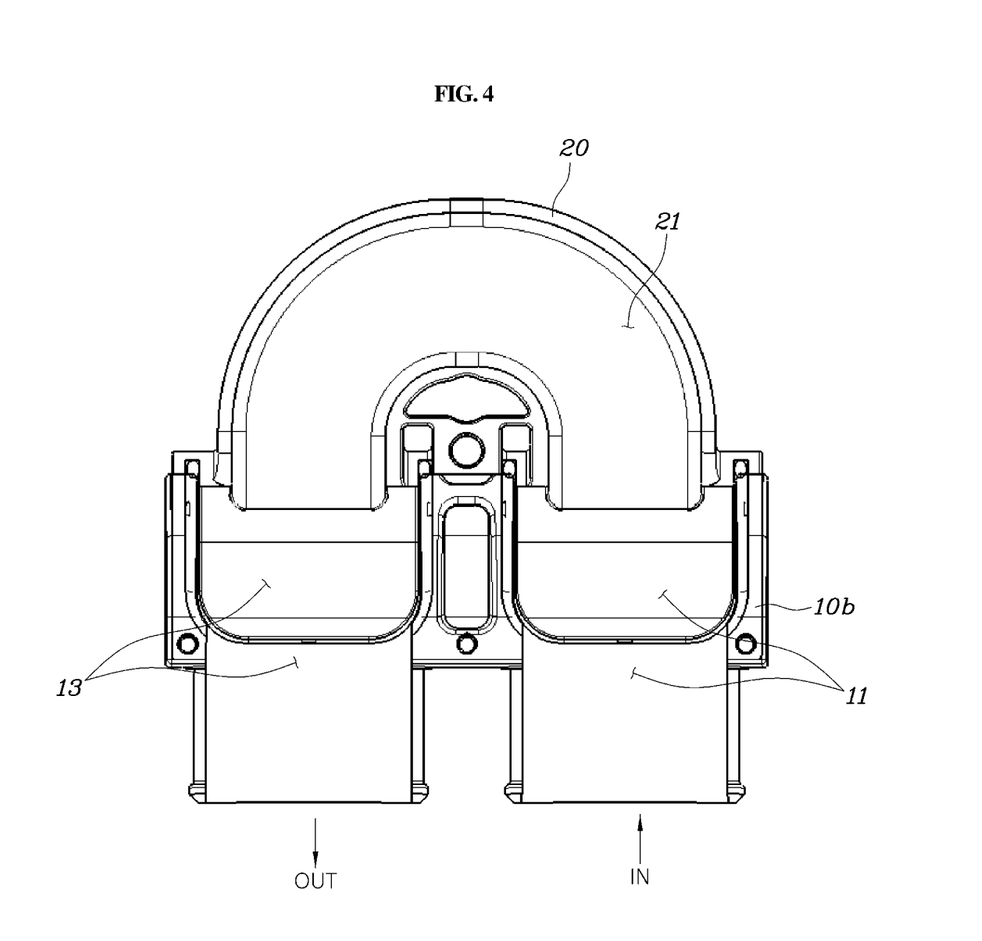
FIG. 4 is a cross-sectional view showing the air shut-off valve apparatus taken along line A-A of FIG. 3 according to an exemplary embodiment of the present invention.
Figure 5:
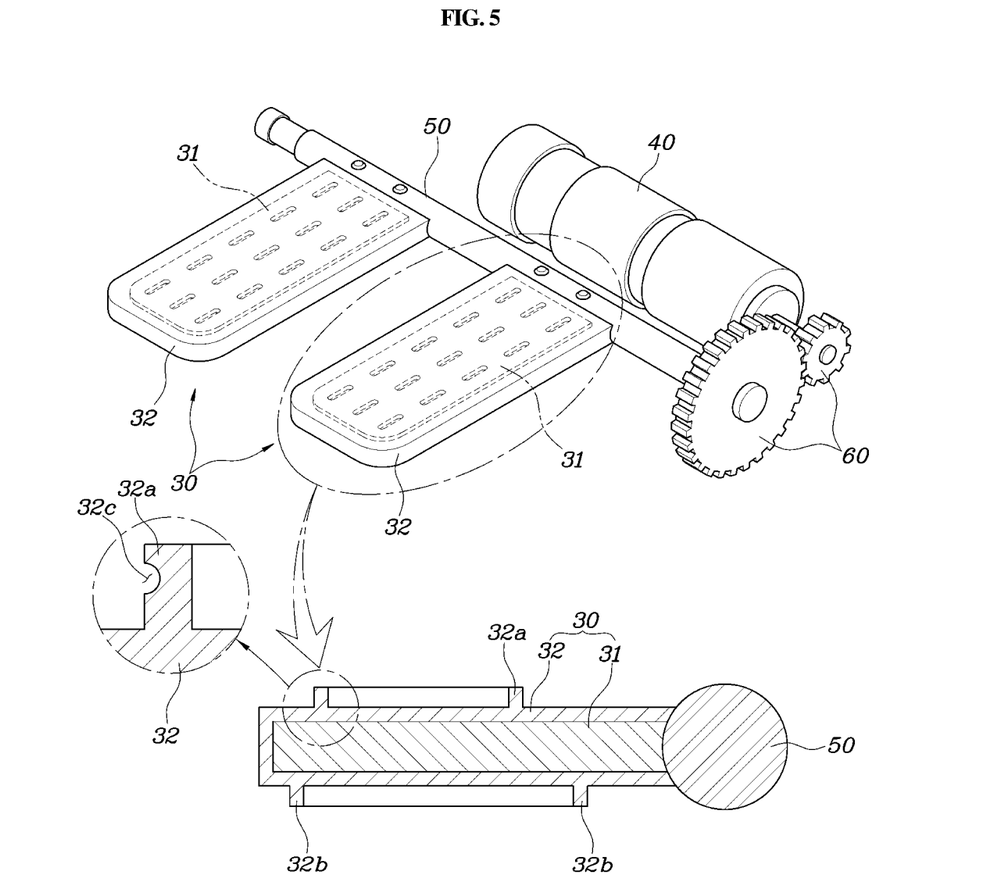
FIG. 5 is a perspective view and a cross-sectional view showing a valve flap according to the exemplary embodiment of the present invention.
Figure 6:
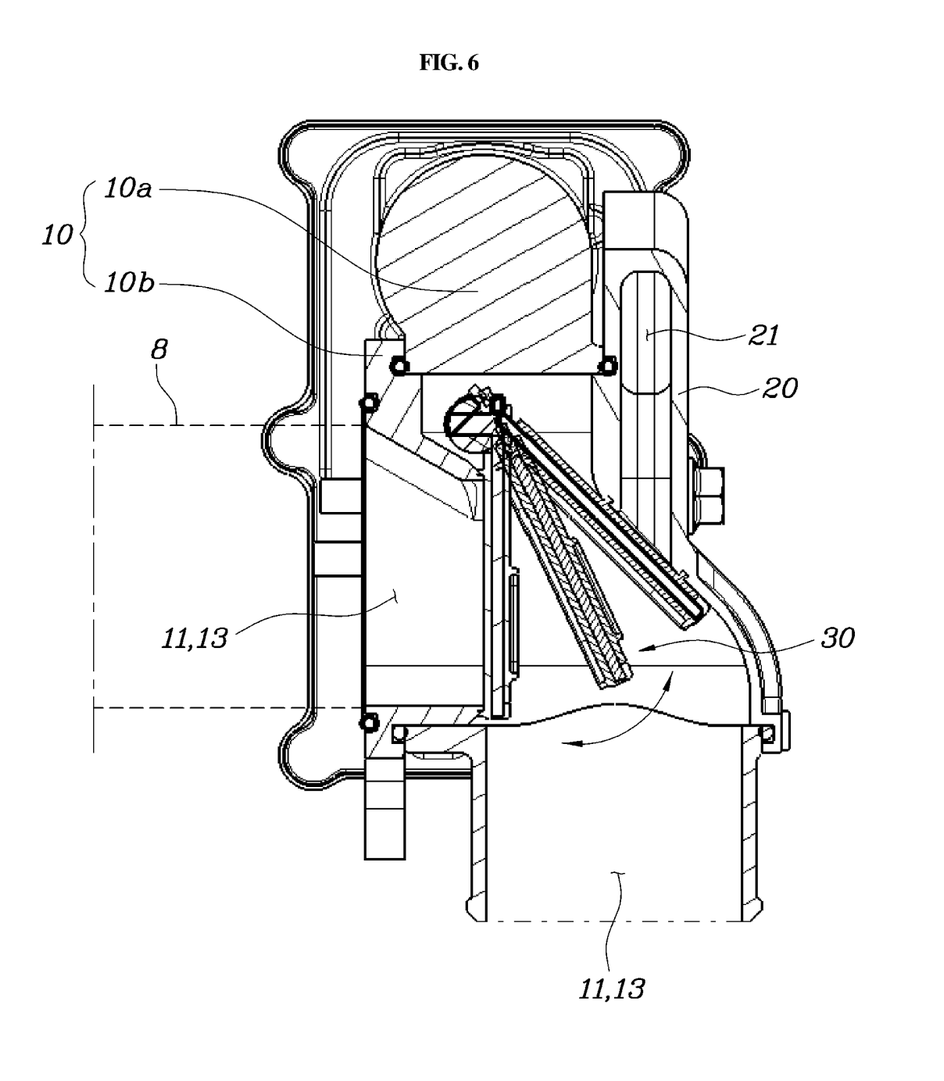
FIG. 6 is a cross-sectional view showing a main portion of the air shut-off valve apparatus according to the exemplary embodiment of the present invention.
Figure 7:
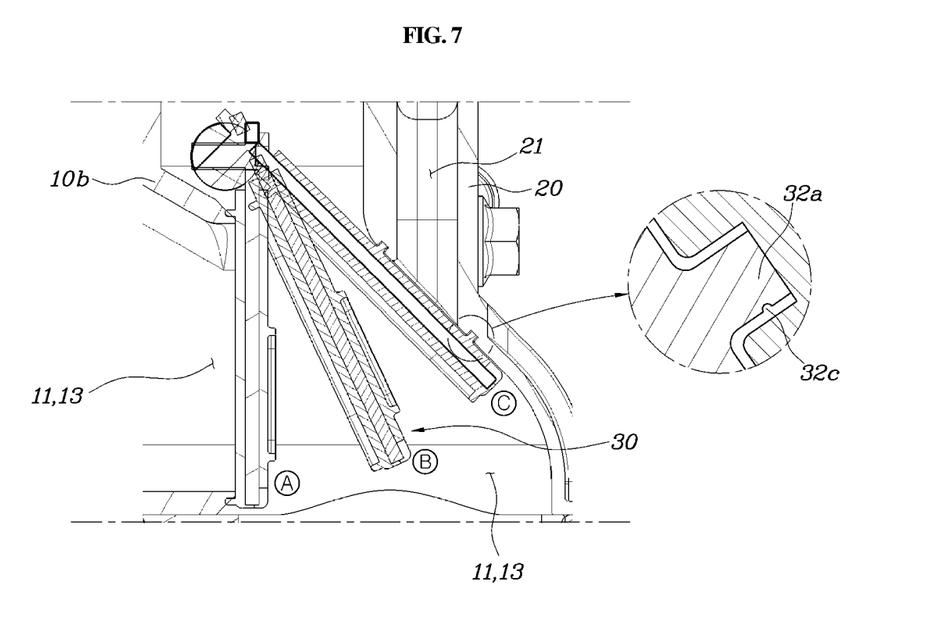
FIG. 7 is a view showing operation of the air shut-off valve apparatus according to an exemplary embodiment of the present invention.

Additionally, the air shut-off valve apparatus according to the exemplary embodiment of the present invention will be described below. FIG. 2 is a perspective view showing the air shut-off valve apparatus according to the exemplary embodiment of the present invention, FIG. 3 is a plan view showing the air shut-off valve apparatus according to the exemplary embodiment of the present invention, FIG. 4 is a cross-sectional view showing the air shut-off valve apparatus taken along line A-A of FIG. 3, FIG. 5 is a perspective view and a cross-sectional view showing a valve flap according to the exemplary embodiment of the present invention, FIG. 6 is a cross-sectional view showing a main portion of the air shut-off valve apparatus according to the exemplary embodiment of the present invention, and FIG. 7 is a view showing operation of the air shut-off valve apparatus according to an exemplary embodiment of the present invention.

As shown in the drawings, the air shut-off valve apparatus 4 according to the exemplary embodiment of the present invention may include a valve body 10 having an inlet air path 11 connected to the cathode 5 of the fuel cell stack 8, and an outlet air path 13; a bypass body 20 having a bypass air path 21; and a valve flap 30 disposed at the valve body 10 in a hinged manner and configured to open and close the inlet air path 11, the outlet air path 13, and the bypass air path 21. The air shut-off valve apparatus 4 according to the present exemplary embodiment may be a butterfly type valve apparatus, which is advantageous in terms of cost compared to a solenoid type.

The valve body 10 may include the inlet air path 11 connected to the cathode 5 of the fuel cell stack 8 and through which air injected into the fuel cell stack 8 flows, and the outlet air path 13 through which air discharged from the fuel cell stack 8 flows. In particular, the inlet air path 11 and the outlet air path 13 may be disposed at one valve body 10, such that the number and an overall size the valve apparatus may be reduced, thereby achieving a reduction in cost. Meanwhile, the valve body 10 may include: a main body 10a that forms an external shape of the valve body, with the valve flap disposed at the main body in a hinged manner (e.g., tilted therefrom); and a sub-body 10b that contacts the valve flap 30 when the valve flap 30 is in a closing operation, wherein the main body 10a and the sub-body 10b may be detachably coupled with each other.

In particular, the sub-body 10b may have higher precision and rigidity than the main body 10a. In other words, the main body 10a may be manufactured by aluminum die casting to reduce weight, and the sub-body 10b may be manufactured of stainless steel of hard anodized aluminum to secure higher precision and rigidity than the main body 10a. The sub-body 10b may have higher precision than the main body 10a to improve air tightness (e.g., leakage prevention) with the valve flap 30.

The sub-body 10b that comes into direct contact with the valve flap 30 may be used to determine air tightness of the inlet air path 11 and the outlet air path 13 when the valve flap 30 is in the closing operation. When the sub-body 10b is manufactured by aluminum die casting like the main body 10a, it may be difficult to regulate precision of the inlet air path 11 and the outlet air path 13. Accordingly, air tightness of the inlet air path 11 and the outlet air path 13 is deteriorated (e.g., the air seal may be insufficient). Accordingly, the sub-body 10b may be manufactured of stainless steel or by hard anodized aluminum. Thus, the present exemplary embodiment enables the sub-body 10b to secure a higher precision than the main body 10a.

Further, the sub-body 10b has higher rigidity than the main body 10a to prevent damage from the valve flap 30. In other words, a part of the valve body 10, which comes into direct contact with the valve flap 30 (e.g., a part at which the inlet air path 11 and the outlet air path 13 are disposed), may freeze during winter or colder air conditions due to moisture contained in the air. When the freezing occurs, part of the valve body 10 may be damaged when it contacts the valve flap 30. Accordingly, the sub-body 10b may be manufactured by being made of stainless steel or by hard anodized aluminum. Thus, the present exemplary embodiment enables the sub-body 10b to secure higher rigidity than the main body 10a.

The bypass body 20 may be coupled to the main body 10a and may include the bypass air path 21 that connects the inlet air path 11 and the outlet air path 13. Accordingly, as the valve flap 30 is tilted, selectively, air supplied through the inlet air path 11 from the outside flows (bypasses) directly to the outlet air path 13 through the bypass air path 21 and is exhausted rather than being directly supplied to the cathode 5 of the fuel cell stack 8. For this purpose, the bypass body 20 may be disposed at a side where external air is introduced, among the inlet air path 11 and outlet air path 13, based on the valve flap 30 position (e.g., tilt angle). Further, the bypass body 20 has higher precision and rigidity than the main body 10a, similarly to the sub-body 10b.

Moreover, the bypass body 20 and the main body 10a may be provided as a single body instead of coupling the bypass body 20 to the main body 10a as in the above-described exemplary embodiment. That is, a plurality of valve flaps 30 may be provided such that valve flaps 30 open and close the inlet air path 11 and the outlet air path 13 at a first side thereof, and the bypass air path 21. Particularly, the valve flaps 30 open and close the bypass air path 21 in communication with the inlet air path 11 and the bypass air path 21 in communication with the outlet air path 13, at a second side thereof. The valve flaps 30 may be configured to simultaneously open and close the inlet air path 11 and the outlet air path 13, and to simultaneously open and close the bypass air path 21 in communication with the inlet air path 11 and the bypass air path 21 in communication with the outlet air path 13.

Further, the air shut-off valve apparatus 4 according to the present invention may further include a valve motor 40 disposed at the main body 10a, a valve shaft 50 rotatably disposed at the main body 10a, with the plurality of valve flaps 30 fixedly coupled with the valve shaft, and valve gears 60 configured to connect the valve motor 40 and the valve shaft 50 and to transmit power of the valve motor 40 to the valve shaft 50. The valve shaft 50 may be disposed in the main body 10a at a location outside the inlet air path 11 and the outlet air path 13 to eliminate flow resistance of air. The valve flaps 30 may completely cover ends of the inlet air path 11 and the outlet air path 13 disposed at the sub-body 10b, and an end of the bypass air path 21 in communication with the inlet air path 11 and an end of the bypass air path 21 in communication with the outlet air path 13 when the valve shaft 50 is rotated.

Therefore, the valve flaps 30 may be tilted in conjunction with rotation of the valve shaft 50 to close the inlet air path 11 and the outlet air path 13 or the bypass air path 21. The inlet air path 11, the outlet air path 13, and the bypass air path 21 may be simultaneously opened by rotation of the valve shaft 50. Each of the valve flaps 30 may include a valve plate 31 made of steel or plastic and coupled with the valve shaft 50, and a plate cover 32 that covers the valve plate 31 and made of a rubber material such that the plate cover 32 absorbs noise and impact when coming into contact with sub-body 10b, thereby improving air tightness with air paths 11, 13, and 21.

In particular, the plate cover 32 may maintain a closed state by sealing ends of the inlet air path 11 and the outlet air path 13 disposed at the sub-body 10, and the end of the bypass air path 21 in communication with the inlet air path 11 and the end of the bypass air path 21 in communication with the outlet air path 13, and also may ensure air tightness required by the fuel cell system. Accordingly, the plate cover 32 that corresponds to the second side of each of the valve flaps 30 may be integrally provided with a first sealing protrusion 32a that contacts a partition wall of the bypass body 20 and surrounds the bypass air path 21.

Moreover, the plate cover 32 that corresponds to the first side of each of the valve flap 30 may be integrally provided with a second sealing protrusion 32b that contacts the partition wall of the bypass body 20 and surrounds the inlet air path 11 and the outlet air path 13. Thus, when the valve flaps 30 seal the bypass air path 21, air tightness may be increased by the first sealing protrusion 32a, and when the valve flaps 30 seal the inlet air path 11 and the outlet air path 13, air tightness may be increased by the second sealing protrusion 32b.

Additionally, the first sealing protrusion 32a may include at least one seal groove 32c at a part thereof where the first sealing protrusion 32a contacts the partition wall of the bypass body 20. Accordingly, when the valve flaps 30 seal the bypass air path 21, high-pressure air pressurizes the first sealing protrusion 32a while flowing into a periphery of the first sealing protrusion 32a and passing the seal groove 32c, to compress the first sealing protrusion 32a to the bypass body 20 at a contact surface therebetween, whereby air tightness may be increased.

Next, a method of controlling the air shut-off valve apparatus configured as described above in operation of the fuel cell system will be described with reference to the drawings. FIG. 7 is a view showing operation of the air shut-off valve apparatus according to the exemplary embodiment of the present invention. The method of controlling the air shut-off valve apparatus for the fuel cell system according to the exemplary embodiment of the present invention is divided into a start-stop step, a first start step, a second start step, and an operation step. The method to be described herein below may be executed by a controller of the system having a processor and a memory.

Particularly, in the start-stop step, as the valve flap 30 closes the inlet air path 11 and the outlet air path 13 ("A" position in FIG. 7), external air may be prevented from being injected into the cathode 5 of the fuel cell stack 8. The air compressor 2 may be inoperative, and hydrogen may also be prevented from being injected into the anode 7 of the fuel cell stack 8. In the first start step, while the valve flap 30 closes the inlet air path 11 and the outlet air path 13, the air compressor 2 may be operated. Further, external air may be supplied to the bypass air path 21 and flows (bypasses) therethrough. Particularly, hydrogen may be injected into the anode 7 of the fuel cell stack 8 and then an inside of the fuel cell stack 8 may be purged with the hydrogen.

In the second start step, as the valve flap 30 is tilted by a predetermined angle to open the bypass air path 21 together with the inlet air path 11 and the outlet air path 13 ("B" position in FIG. 7), the fuel cell stack 8 and the bypass air path 21 may be simultaneously supplied with air. Then, hydrogen purged in the fuel cell stack 8 may be mixed with air flowing through the bypass air path 21 while the hydrogen is discharged to the outlet air path 13, and is thereby exhausted in a diluted state. Thus, it may be possible to reduce concentration of hydrogen in exhaust gas exhausted at the beginning of starting the fuel cell system.

In the operation step, as the valve flap 30 is tilted, the valve air path 21 may be closed while the inlet air path 11 and the outlet air path 13 are fully opened ("C" position in FIG. 7). Air flows into the inlet air path 11 and the outlet air path 13 while being prevented from flowing into the bypass air path 21. The effects of the present invention will be described with reference to a comparative example and an example.

The comparative example is an operation model of a general fuel cell system in which air bypass is not applied when starting the system, and the example is an operation model of the fuel cell system according to an exemplary embodiment of the present invention in which air bypass is applied when starting the system. Accordingly, concentration of discharged hydrogen was measured according to the driving degree of the air compressor when the comparative example and the example were operated, and results are shown in Table 1.

TABLE 1

| Item | Air Compressor rpm(krpm) | | | |
| --- | --- | --- | --- | --- |
| | 25 | 30 | 35 | 40 |
| Hydrogen Concentration(%) of Comparative Example | 7.0 | 4.5 | 4.1 | 3.6 |
| Hydrogen Concentration(%) of Example | 4.4 | 4.0 | 3.3 | 3.1 |

As shown in Table 1, in the example, hydrogen peak concentration was found to be in a range of about 3.3 to 3.1% (satisfying equal to or less than 4%). On the other hand, in the comparative example, hydrogen peak concentration satisfies equal to or less than about 4% only when hydrogen is supercharged through the air compressor (e.g., increase in consumption power, reduction in fuel mileage)

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An air shut-off valve apparatus for a fuel cell system, comprising:
   a valve body having an inlet air path connected to a cathode of a fuel cell stack and through which air injected into the fuel cell stack flows, and an outlet air path through which air discharged from the fuel cell stack flows;
   a bypass body having a bypass air path that connects the inlet air path and the outlet air path;
   a plurality of valve flaps disposed at the valve body and configured to open and close the inlet air path and the outlet air path at a first side thereof, and to open and close the bypass air path at a second side thereof,
   a valve motor disposed at the valve body; and
   a valve shaft rotatably disposed at the valve body to be operated in conjunction with operation of the valve motor, with the valve flap fixedly coupled with valve shaft,
   wherein the plurality of valve flaps are provided to open and close the inlet air path and the outlet air path at the first sides thereof, and open and close the bypass air path at the second sides thereof, wherein each of the valve flaps includes:
      a valve plate coupled with the valve shaft; and
      a plate cover made of a rubber material and covering the valve plate,
   wherein each plate cover that corresponds to the first side of each of the valve flaps is integrally provided with a second sealing protrusion that contacts the partition wall of the bypass body and surrounds the inlet air path and the outlet air path,
   wherein the valve body includes:
      a main body that forms an external shape of the valve body, with the valve flap disposed at the main body; and
      a sub-body that contacts the valve flap when the valve flap is in a closing operation, and being coupled with the fuel cell stack, and the bypass body is coupled with the main body.

2. The apparatus of claim 1, wherein the bypass body communicates with both the inlet air path and the outlet air path in a direction in which the air injected into the fuel cell stack is introduced, based on a position of the valve flap.

3. The apparatus of claim 1, wherein each plate cover that corresponds to the second side of each of the valve flaps is integrally provided with a first sealing protrusion that contacts a partition wall of the bypass body and surrounds the bypass air path.

4. The apparatus of claim 3, wherein the first sealing protrusion includes at least one sealing groove at a portion thereof where the first sealing protrusion contacts the partition wall of the bypass body.

5. The apparatus of claim 1, wherein the sub-body and the bypass body have higher precision than the main body to improve air tightness.

6. The apparatus of claim 1, wherein the sub-body and the bypass body have higher rigidity than the main body to prevent damage from the valve flap.

7. The apparatus of claim 1, wherein the valve body includes:
   a main body that forms an external shape of the valve body, with the valve flap disposed at the main body; and
   a sub-body that contacts the valve flap when the valve flap is in a closing operation, and being coupled with the fuel cell stack, and the bypass body is integrated with the main body into a single body.

* * * * *